United States Patent Office 3,522,212
Patented July 28, 1970

3,522,212
COPOLYMERS OF PERHALOACETONE AND
PROPYLENE SULFIDE
Harry A. Smith, Midland, Mich., assignor to The Dow
Chemical Company, Midland, Mich., a corporation of
Delaware
No Drawing. Filed Feb. 19, 1968, Ser. No. 709,524
Int. Cl. C08g 15/00
U.S. Cl. 260—63   9 Claims

ABSTRACT OF THE DISCLOSURE

A novel polymer composition of a perhaloacetone and propylene sulfide and to a method of preparing the same. The method comprises reacting a perhaloacetone with propylene sulfide at a maximum temperature of about 100° C. for a period of up to 24 hours or more under autogenous pressures. The copolymer prepared from this method is useful as a lubricant, in the plasticizing of fluoroacetone epoxide polymers and a soil stabilizer.

SUMMARY

The present invention concerns a copolymer which corresponds to the formula

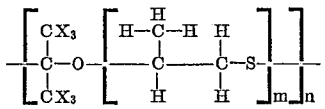

wherein X is a halogen and the gram-mole ratio of perhaloacetone to propylene sulfide in the polymer is at a maximum of about 1, that is, $m$ is an integer of at least 1 and $n$ is an integer greater than 1. The copolymers are prepared by reacting a perhaloacetone with propylene sulfide at temperatures of from about 0° C. to about 100° C. for a period of at least several minutes, to greater than 24 hours, depending on the reaction temperature employed, in a sealed reactor under autogenous pressures. For ease of separation of the final copolymer from the reactants, an excess of perhaloacetone can be employed. The propylene sulfide is usually completely consumed by the reaction whereas a portion of the perhaloacetone does not react. The residual monomeric perhaloacetone may be recovered from the polymeric product and recycled if desired.

The term "halo" as employed herein with reference to the acetone reactants is meant to include chloro- and fluoro- substituents.

PREFERRED EMBODIMENT

The copolymer of the present invention corresponds to the formula

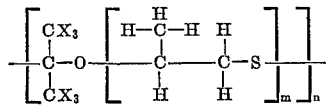

wherein $m$ and $n$ are integers greater than 1, preferably wherein $m$ is an integer which averages from about 4.5 to 6.5, and X is either fluoro- and/or chloro-substituents.

Usually in preparing the copolymer composition the perhaloacetone is reacted with propylene sulfide in a sealed reactor at a temperature of from about 0° C. to about 100° C. under autogenous pressures. Preferably propylene sulfide is usually frozen such as employing liquid nitrogen, in a reactor, the perhaloacetone is added thereto and the reactor is sealed. The reaction mixture is then warmed to a temperature preferably of from about 15–50° C. and usually about room temperature and maintained at said temperature until said reaction is complete. Ordinarily a reaction time of 24 hours and usually at least about 48 hours, at a room temperature of from about 18° C. to about 25° C. is required. Shorter reaction times are possible when employing higher reaction temperatures, however, there is usually a loss of product. The reaction mixture is then usually frozen, the reactor opened and unreacted monomer compounds are separated from the polymer product.

The reactants are usually employed in a gram-mole proportion of perhaloacetone/propylene sulfide ranging from about 10/1 to about 1/10. Normally a gram-mole proportion of about 1/1 to 1/6 (perhaloacetone/propylene sulfide) is preferred.

It is usually preferred to conduct the reaction in the presence of from about 0.0001–1.0 mole percent, preferably from about 0.0001 to 0.1 mole percent (based on the monomer present in least amount, in moles, in the reaction mixture) of a weak basic material as a catalyst. Such catalyst is not essential, however, it does facilitate the reaction and improve the reaction rate. Also, by controlling the quantity of catalyst the molecular weight of the polymer can be controlled within predetermined limits. Examples of suitable catalysts include alkali metal fluoride such as cesium fluoride, or rubidium, fluoride, alkali metal acetate, such as sodium acetate or potassium acetate, alkali metal carbonates, pyridine, triethylenediamine, quaternary ammonium salts and the like.

The reaction may also be carried out in the presence of an inert solvent, e.g., hexane, or other hydrocarbon or chlorocarbon solvents.

Examples of perhaloacetones suitable for use in the present invention include perfluoroacetone, (hexafluoroacetone) and perchloroacetone (hexachloroacetone) as well as mixed chloro- and fluoro-substituted acetones. Illustrative mixed perhaloacetones include dichlorotetrafluoroacetone, tetrachlorodifluoroacetone, monochloropentafluoroacetone and the like. Perfluoroacetone is a particularly desirable reactant in that it leads to highly fluorinated polymeric products.

The copolymers resulting from the copolymerization of perfluoroacetone and propylene sulfide are both oleophobic and hydrophobic and find use as protective film surface coatings for metals, glass, ceramics, plastics and the like.

The following examples will facilitate a more complete understanding of the present invention but the invention is not meant to be limited thereto.

Example 1

A copolymer of perfluoroacetone and propylene sulfide was prepared in the following manner. Propylene sulfide (1.48 grams, 0.02 mole) and hexafluoroacetone (3.32 grams, 0.02 mole) were added at minus 196° C. to an oven dried ampul containing dry cesium fluoride (0.015 gram, $10^{-4}$ mole). The ampul was sealed and warmed and maintained at room temperature for 2 days with shaking, allowing the reactants to polymerize. After two days the contents of the ampul were again frozen to a temperature of about minus 196° C. and the ampul was opened. The unreacted monomeric compounds were distilled off leaving a viscous oil copolymer product. Partial elemental analysis of the oil gave C—39.8%, H—5.68% and F—21.7% indicating a copolymer of 1 part hexafluoroacetone to 4.8 parts propylene sulfide. The calculated analysis for this copolymer is C—40.0%, H—5.56%, and F—21.9%.

Example 2

To determine the affect of concentrations of the monomer compounds and the quantity of initiator on the molecular weight of the copolymer produced, several samples of copolymers were prepared under conditions similar to those in Example 1 except the mole ratio of monomer compounds and quantity of initiator were varied. The copolymers which were prepared had an average molar proportion (based on an elemental analysis) of acetone to sulfide in the copolymers ranging from 1/4.8 to 1/7.5. The reaction conditions and partial elemental analysis for each sample is tabulated in following Table I.

2. The composition of matter as defined in claim 1 wherein $m$ is an integer averaging from about 4.5 to about 6.5.

3. The composition of matter as defined in claim 2 wherein X is fluorine.

4. The composition of matter as defined in claim 1 wherein X is fluorine.

TABLE I

| Sample | Mole proportion HFA/PS [1] | Proportion of monomer present in lowest quantity to CsF | Percent yield [2] | Analysis | | | | | | Copolymer proportion HFA/PS |
|---|---|---|---|---|---|---|---|---|---|---|
| | | | | Actual | | | Theoretical | | | |
| | | | | C | H | F | C | H | F | |
| 1 | 10/1 | 200/1 | 94.0 | 40.4 | 5.86 | 20.8 | 40.4 | 5.67 | 20.9 | 1/5.1 |
| 2 | 5/1 | 200/1 | 94.0 | 40.6 | 6.00 | 20.3 | 40.6 | 5.73 | 20.4 | 1/5.3 |
| 3 | 3/1 | 200/1 | 94.0 | 40.6 | 5.80 | 19.7 | 40.8 | 5.79 | 19.9 | 1/5.5 |
| 4 | 2/1 | 200/1 | 96.0 | 39.7 | 5.60 | 22.3 | 39.9 | 5.52 | 22.2 | 1/4.7 |
| 5 | 1/1 | 200/1 | 106.0 | 39.8 | 5.68 | 21.7 | 40.0 | 5.56 | 21.9 | 1/4.8 |
| 6 | 1/2.4 | 200/1 | 45.3 | 41.0 | 5.76 | ------ | 41.0 | 5.85 | 19.4 | 1/5.7 |
| 7 | 1/5 | 200/1 | 91.3 | 41.2 | 5.96 | ------ | 41.3 | 5.94 | 18.6 | 1/6 |
| 8 | 1/10 | 200/1 | 85.5 | 42.3 | 6.00 | ------ | 42.4 | 6.27 | 15.8 | 1/7.5 |
| 9 | 1/1 | 20/1 | 100.0 | 41.2 | 5.90 | ------ | 41.3 | 5.94 | 18.6 | 1/6 |
| 10 | 1/1 | 200/1 | 96.5 | 39.8 | 5.68 | 21.7 | 40.0 | 5.56 | 21.9 | 1/4.8 |
| 11 | 1/1 | 2,000/1 | 87.5 | 41.6 | 6.16 | ------ | 41.6 | 6.03 | 17.8 | 1/6.4 |

[1] HFA = Hexafluoro acetone; PS = Propylene sulfide.
[2] Percent yield based on copolymer composition found by analysis.

In Samples 1 through 8 the reaction mixtures were varied from very polar (excess of HFA) to non-polar (excess PS). The molecular weight of the polymers are fairly independent of the reactant proportion and solvent polarity, i.e. Examples 1 through 7 the copolymer proportion varied between about 1/4.7 and 1/6. With a very low proportion HFA/PS of 1/10 a copolymer proportion HFA/PS of 1/7.5 was prepared.

Examples 9, 10 and 11 show the effect of initiator (CsF) concentrations on yield. Essentially no effect on the composition of the copolymer is present, however, there is an effect on the rate as indicated by yield, for a reaction time of 2 days.

Various modifications may be made in the present invention without departing from the spirit or scope thereof defined for it is understood that I am limited only as defined in the appended claims.

I claim:
1. A composition of matter consisting essentially of the formula

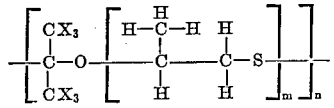

wherein X corresponds to a halogen selected from the group consisting of chlorine and fluorine and $m$ is an integer of at least 1 and $n$ is an integer greater than 1.

5. A process for preparing a copolymer containing a perhaloacetone and propylene sulfide which comprises:
   (a) reacting a perhaloacetone with propylene sulfide, gram-mole proportion of said acetone to said propylene sulfide reactants ranging from about 10/1 to 1/10, at a maximum temperature of about 100° C. for at least about several minutes.

6. The process as defined in claim 5 wherein the reaction is carried out in the presence of a weak base catalyst.

7. The process as defined in claim 5 wherein the gram-mole proportion of perhaloacetone to propylene sulfide reactants ranges from about 1/1 to about 1/6.

8. The process as defined in claim 5 wherein the reaction temperature ranges from about 15° to about 50° C. for a reaction period of at least twenty-four hours.

9. The process as defined in claim 5 wherein the perhaloacetone comprises perfluoroacetone.

References Cited
UNITED STATES PATENTS
3,316,216  4/1967  Fawcett et al. _____ 260—63

WILLIAM H. SHORT, Primary Examiner

L. L. LEE, Assistant Examiner

U.S. Cl. X.R.
260—33.6, 33.8, 79.7, 609